March 24, 1964  E. P. HALLIGAN  3,126,186
TRIPOD AND BRACKET MEANS THEREFOR
Filed Feb. 20, 1962  2 Sheets-Sheet 1

INVENTOR.
EUGENE P. HALLIGAN
BY
Hofgren, Brady, Wegner,
Allen & Stettman  ATTYS.

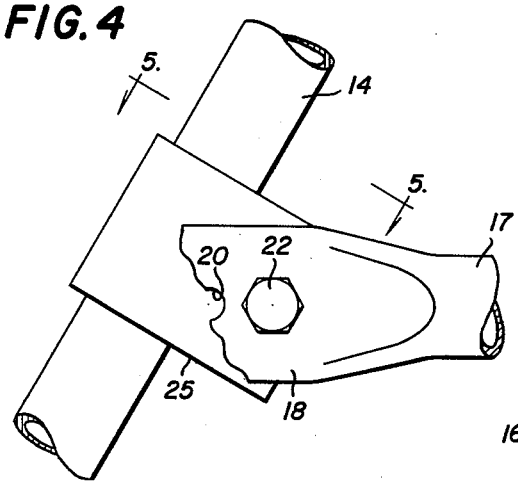
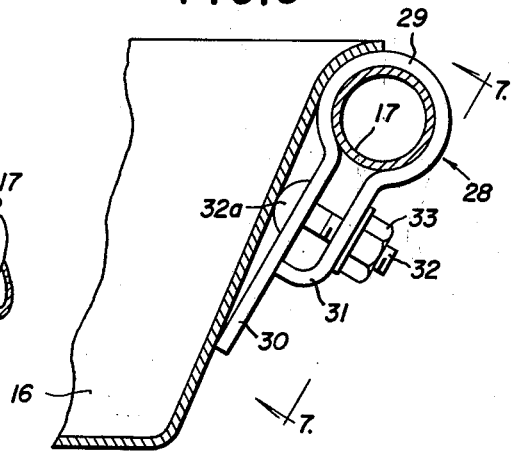
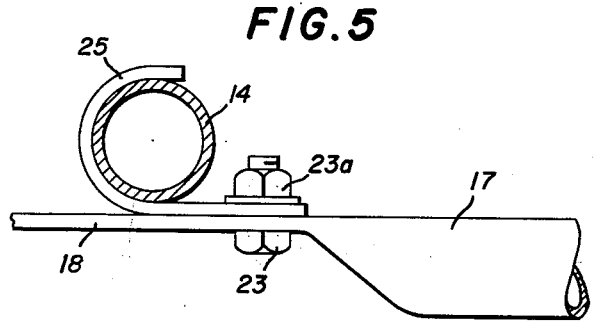
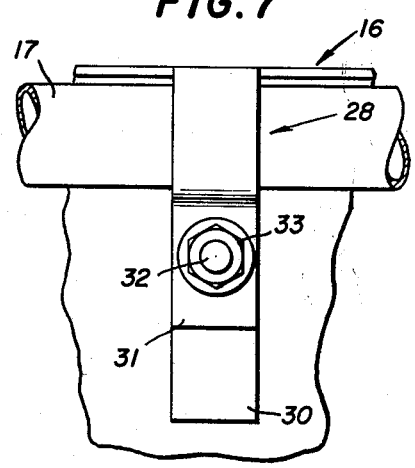
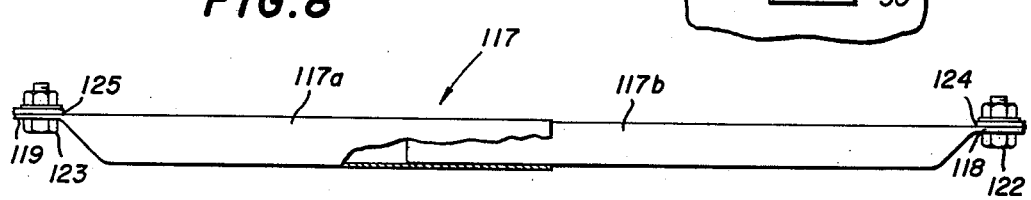
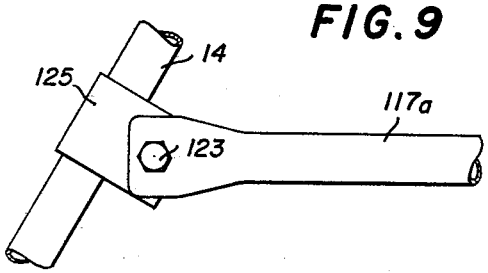

United States Patent Office 3,126,186
Patented Mar. 24, 1964

3,126,186
TRIPOD AND BRACKET MEANS THEREFOR
Eugene P. Halligan, Glen Ellyn, Ill., assignor, by mesne assignments, to Lectrolite Corporation, a corporation of Maryland
Filed Feb. 20, 1962, Ser. No. 174,445
5 Claims. (Cl. 248—122)

This invention relates to tool supporting tripods and like multi-legged supports, and in particular it relates to bracket means for detachably mounting a device such as a tray on a multi-legged support.

Tripods and like multi-legged supports are commonly used for portable tools, such as pipe thread cutters and similar units. It is often necessary to support a drip pan, a chip tray, or an auxiliary tool tray on the legs of such a tripod and insofar as applicant is aware there has heretofore been no satisfactory bracket for mounting such a tray on the legs of a tripod.

The principal object of the present invention, therefore, is to provide bracket means for detachably mounting a device such as a tray upon the legs of a tripod or like multi-legged supports.

Another object of the invention is to provide a bracket which may be rapidly and easily hung upon the legs of a tripod.

Yet another object of the invention is to provide a bracket the length of which may be adjusted to accommodate the unit to tripods of varying leg spans.

Still another object of the invention is to provide a bracket which includes an adjustable stabilizing clamp providing an abutment to aid in locating a cantilever mounted article in a predetermined position.

The invention is illustrated in a preferred embodiment and an alternative embodiment in the accompanying drawings, in which:

FIG. 4 is a fragmentary front elevational view on an enlarged scale, illustrating an end of the hanger bar and associated mounting hook as hooked upon a leg of a tripod;

FIG. 5 is a fragmentary section taken substantially as illustrated along the line 5—5 of FIG. 4;

FIG. 6 is a fragmentary section on an enlarged scale taken substantially as illustrated along the line 6—6 of FIG. 1;

FIG. 7 is a fragmentary view taken substantially as illustrated on line 7—7 of FIG. 6;

FIG. 8 is a fragmentary plan view, partially in section, of a modified form of hanger bar; and FIG. 9 is a fragmentary front elevational view illustrating the assembled relationship between the hanger bar of FIG. 8, its mounting hook, and a tripod leg.

Figure 1:
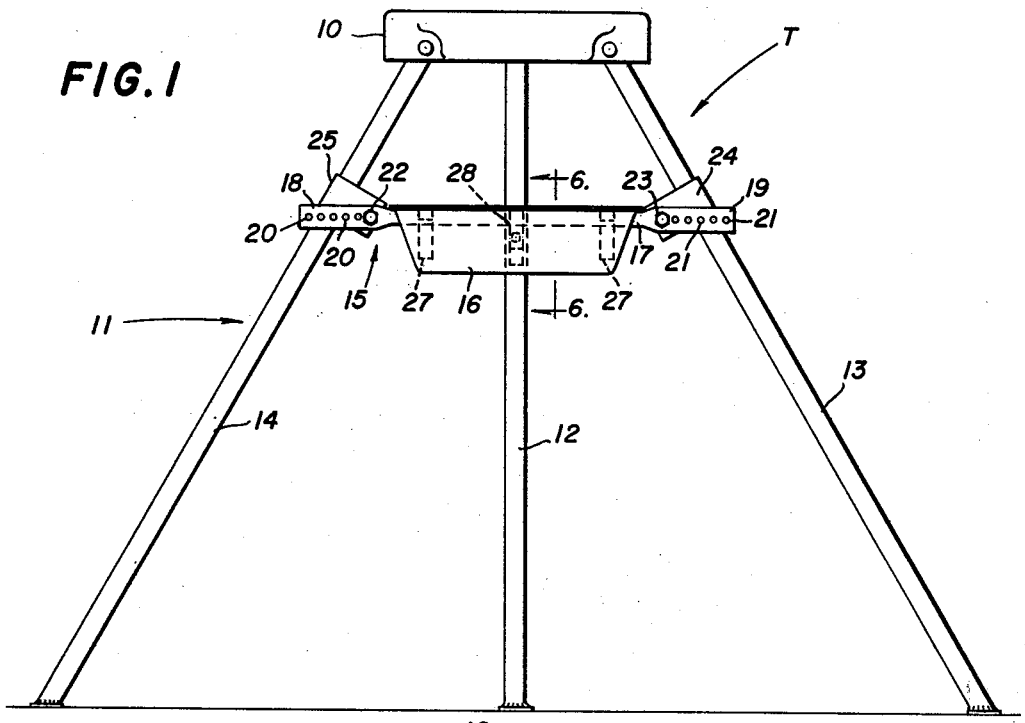
FIG. 1 is a front elevational view of a tripod supplied with a bracket and drip pan in accordance with the invention.
Figure 2:
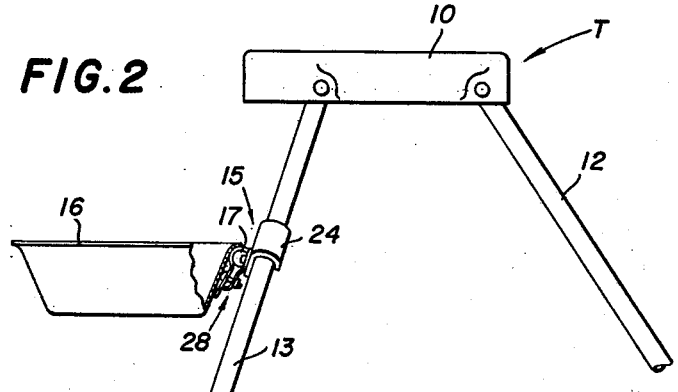
FIG. 2 is a side elevational view of a tripod, bracket and drip pan.

Referring to the drawings in greater detail, and referring first to FIGS. 1 and 2, a multi-legged support, which in the illustrated embodiment is a tripod T, has a tool supporting head 10 and support means, indicated generally at 11, consisting of a rear leg 12 and front legs 13 and 14. The device of the present invention comprises bracket means, indicated generally at 15, upon which a drip pan 16 is mounted in cantilever fashion.

The bracket means 15 is best seen in FIGS. 1, 2, and 4 to 7, inclusive, consist of a tubular hanger bar 17 having flat end portions 18 and 19 provided, respectively, with a series of mounting holes 20 and 21. One of the mounting holes 20 is provided with a removable mounting stud such as a bolt 22, while similarly a bolt 23 extends through mounting holes 21. Each of the bolts 22 and 23 is provided, respectively, with a nut such as the nut 23a (FIG. 5), so that a mounting hook 24 may be pivotally supported upon the stud 22 and a similar mounting hook 25 upon the stud 23. The hooks 24 and 25 are loosely pivoted upon their respective studs, or bolts, and are fabricated out of relatively wide sheet metal straps extending around and loosely embracing the legs 14 and 15 so that the hanger bar 17 may be easily supported on or unhooked from the legs 14 and 15 of the tripod. Preferably each hook is adjusted to an angle on the hanger bar which positions it perpendicular to the leg with which it is engaged, and the nuts (such as 23a) are then tightened to lock the hooks at that angle.

Figure 3:
FIG. 3 is a side elevational view of the drip pan on an enlarged scale.

As is apparent from the drawings, and especially FIG. 3, drip pan 16 is supported on hanger bars 17 in cantilever fashion by means of a pair of hooks 27 which are welded to the back wall of the drip pan adjacent its two ends. In order to keep the drip pan in horizontal position, hanger bar 17 is seen in FIGS. 6 and 7 to be provided with a stabilizing clamp, indicated generally at 28, which has a loop portion 29 surrounding the hanger bar, a flat arm 30 and a hanger arm 31 which are impaled by a clamp bolt 32 which receives a nut 33 so that the stabilizing clamp 28 may be secured to the hanger bar 17 at any desired angle with its lower end abutting the back of drip tray 16, thus accommodating the bracket means 15 to a device such as the drip tray 16 or any other pan or tray of different configuration.

Referring now to FIGURES 8 and 9, an alternative form of hanger bar, indicated generally at 117, consists of outer and inner telescoping tubular members indicated, respectively, as 117a and 117b. Since the length of hanger bar 117 may be adjusted by sliding the telescoping tubular members with respect to one another, said members have short flattened end portions 118 and 119 which are impaled, respectively, by bolts 122 and 123 to receive mounting hooks 124 and 125 which are identical with the mounting hooks 24 and 25 in the preferred embodiment of the device.

The foregoing detailed description has been given for clearness of understanding only and no unnecessary limitations should be understood therefrom as some modifications will be obvious to those skilled in the art.

I claim:

1. In a multi-legged support: a head member; support means including a pair of downwardly diverging legs supporting said head member; a hanger bar between said legs; a pivoted hook at each end of said hanger bar, each hook embracing one of the downwardly diverging legs; hanger means swingably engaging the bar for supporting thereon a device secured to said hanger means; and a stabilizing abutment member secured on the hanger bar, said abutment member including a downwardly extending arm providing a rear stabilizing abutment that cooperates with the hanger means to support the device on the bar in cantilever fashion; and means for adjusting the angle of said arm with respect to the ends of the hanger bar so that the arm may stabilize devices of different configurations at any desired angle.

2. The support of claim 1 in which the abutment member includes means encircling the hanger bar, and means for clamping said encircling means onto the hanger bar with the abutment arm at any desired angle with respect to said bar.

3. The support of claim 1 in which the downwardly diverging legs are pivoted on the head member, and the hanger bar includes means for adjusting the distance between the hooks.

4. The support of claim 1 in which the hanger bar includes a stud adjacent each of its ends, and the hooks are pivoted on said studs.

5. The support of claim 1 which includes means for locking each hook at any desired angle to the hanger bar, whereby each hook may be fixed on the bar perpendicular to the leg with which it is engaged.

References Cited in the file of this patent

UNITED STATES PATENTS

| 1,069,160 | Meltz | Aug. 5, 1913 |
| 1,602,261 | Hill | Oct. 5, 1926 |
| 2,283,092 | Rosen | May 12, 1942 |
| 2,550,550 | Goodstein | Apr. 24, 1951 |
| 2,983,472 | Bowling | May 9, 1961 |